United States Patent Office 2,708,369
Patented May 17, 1955

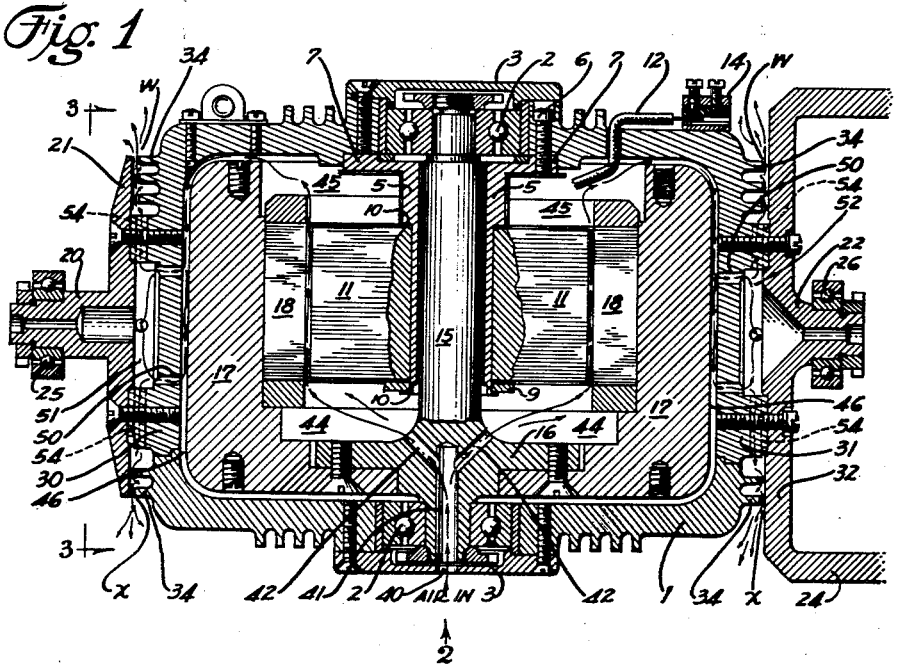

2,708,369

GYRO COOLING SYSTEM

Bruce E. Dixson, Hawthorne, Calif., assignor to Northrop Aircraft, Inc., Hawthorne, Calif., a corporation of California Application June 17, 1949, Serial No. 99,652

7 Claims. (Cl. 74—5.7)

My invention relates to gyroscopes and more particularly to a means for cooling a gyroscope motor during operation thereof.

When gyroscopes, or gyros, as they will hereinafter be termed, are utilized for precision indication of a particular position, the gyro should be constructed and mounted to have a minimum spurious drift rate. The random torques causing spurious drift are mainly due to bearing friction, unbalance, and airflow torques. These latter forces become particularly important when electric motors are utilized to drive the gyro mass, as in most instances it is desirable to cool the gyro motor by passing air thereover.

It is an object of the present invention to provide an air cooling system for an electrically driven gyro without incurring a damaging airflow torque.

It is another object of the present invention to provide a means for venting an airflow from a gyro in such a manner that no jet torques are applied to the gyro.

It is still another object of the present invention to provide a simple, torque free cooling system for a gyro motor.

In broad terms, the present invention comprises a gyro mass driven by an electric motor, the rotor thereof being shaped to promote airflow by virtue of a pressure differential created by the centrifugal effect of the spinning rotor. Cool outside air is admitted to the gyro axially through the center of the gyro rotor shaft, and directed between the rotor and stator portions of the gyro to provide convective cooling, made effective by the turbulence induced as a result of the differential speeds of the two units. The air is exhausted from the case at the sides of the gyro, and means are provided at the exhaust area to prevent any objectionable jet effect which would produce a spurious torque tending to displace the spin axis. The cooling may also be supplemented by the use of cooling fins on the gyro casing.

The invention may be more fully understood by reference to the drawings, in which:

Figure 1 is a cross sectional view of a gyro motor embodying the present invention in a preferred form.

Figure 2 is an end view of the gyro shown in Figure 1 taken as indicated by arrow 2 in Figure 1.

Figure 3 is a partial side view of the gyro as indicated by line 3 in Figure 1.

As the cooling system herein claimed relates to the gyro motor only, no suspension for the gyro is shown. It is adapted to be mounted in gimbals or similar suspension devices as desired. The gyro illustrated is primarily adapted for use as a directional gyro.

Referring to the drawings, a gyro case 1 is provided, generally of cylindrical shape with substantially flat ends, each end supporting a shaft bearing 2 of the ball type, these bearings being held on the case by end caps 3.

Adjacent one end of the case 1 a hollow stub 5 is secured to the case by the use of screws 6 engaging a stub shoulder 7. Stub 5 extends axially through the case 1 to terminate well past the center thereof. Firmly fastened to stub 5 by means of an end ring 9 and shoulder 10 is a motor stator 11 of the type used in induction motors. Leads 12 from the stator are brought out through the case to an exterior connection block 14 on one end of the case 1.

A motor shaft 15 is provided, supported in bearings 2, this shaft extending through the interior of hollow stub 5 but not bearing thereagainst. Shaft 15 is provided with a shaft shoulder 16 to which is firmly attached a hollow gyro mass 17 extending along the case adjacent the interior surface thereof. Between the gyro mass 17 and stator 11, positioned by and fastened to gyro mass 17 is a motor rotor 18. The device so far described is an induction type motor with the rotor outside of the stator. This arrangement is to permit the use of the maximum moment arm of mass 17 within the case 1.

Case 1 is able to revolve on an axis at right angles to the axis of shaft 15, by the provision of a stub shaft 20 attached to a side plate 21 at one side of the case 1, and of a cup stub 22 on the other side of the case, this cup stub 22 being part of a cup 24 secured to the case 1 opposite stub shaft side plate 21, this cup forming the case for a torque motor used to apply desired torques to the gyro. This torque motor is no part of the present invention and the details thereof are not shown.

Case 1 is then rotatable in bearings 25 and 26 engaging stub shaft 20 and cup stub 22 respectively.

The present invention is primarily concerned with the cooling of the gyro motor. One preferred cooling system will be next described.

Side plate 21 and cup 24 are secured by screws to cylindrical side extensions of case 1, numbered 30 and 31 respectively, these cylindrical extensions being hollow and concentric with stub shaft 20 and cup stub 22. Both the side plate 21 and the base 32 of cup 24 extend outwardly beyond the outer surface of cylindrical extensions 30 and 31.

Outside of cylindrical extensions 30 and 31 the case 1 is provided with fully circular cooling fins 34 positioned in the plane of rotation of the gyro motor. Additional cooling fins 35 (see Figure 3) are positioned between opposite sets of circular fins 34. These additional fins being likewise parallel to the plane of rotation of the gyro motor but interrupted by the presence of the cylindrical extensions 30 and 31.

Thus at two points W and X on each side of the gyro case, the side plate 21 and cup base 32 closely approach the circular ribs 34. Starting at these two points, the outer periphery of side plate 21 and base 32 gradually curve inward and about the cylindrical case to points Y and Z 90° rearward from points W and X to form lips 36 and 37 respectively thus extending to terminate close to the circular ribs at all times as shown in Figure 2 and in Figure 3. Figure 3 illustrates the substantially elliptical plan form of the side plate 21, this figure being reduced one-half from Figure 2 and rotated 90°.

At the end of the gyro shaft 15 carrying the shaft shoulder 16, the adjacent end cap 3 is provided with a case inlet bore 40 coaxial with the axis of shaft 15. This same end of the shaft 15 is provided with a shaft bore 41 extending into the region of shoulder 16. Shaft bore 41 is continued with a plurality of radial bores 42 opening into the annular interior of the gyro space 44 between the shoulder 16 and the gyro or motor stator 11. Outside air thus contacts both rotor 18 and stator 11 elements. This air can pass between rotor 11 and stator 18 to the opposite side of these elements to enter an opposite annular space 45 between the end of the rotor and stator elements and the case 1.

As a clearance 46 is required between the rotor mass 17 and the case 1, air entering the case inlet 40 can pass around the rotor to peripheral points lying close to the axis of case rotation as determined by the coaxial stub shaft 20 and cup stub 22.

A plurality of case outlets 50 is provided in the case 1 opposite both the side plate 21 and cup base 32 so that the air can reach spaces 51 and 52 respectively; between side plate 21 and the case, and the cup base 32 and the case, the sides of these spaces being defined by the interiors of hollow cylindrical extensions 30 and 31. These spaces 51 and 52 function as plenum chambers to equalize the pressure of the cooling air before it is further exhausted to the atmosphere.

A plurality of radial air vents 54, provided in the cylindrical extensions 30 and 31, now directs the air radially outward equally about the axis of case rotation. The air is then made to follow the inside surfaces of the side plate 21 and cup base 32 to pass through clearances these surfaces make with the cooling ribs.

At points near W and X, some of the air passes crosswise over the tops of the completely circular ribs to the atmosphere as shown in Figure 1. Any jet effect left in the air at these points is balanced or cancelled out due to the symmetry of air emission resulting in no torque about the case rotation axis.

At points nearer Y and Z, the air tends to escape by passing under lips 36 and 37 through the channels between adjacent cooling ribs. Thus any jet effect of air in this direction, in addition to being balanced by symmetry, occurs in the plane of rotation of the gyro motor and is of no consequence.

The air is moved through the path as above outlined by the centrifugal effect of the spinning rotor, and passes between the rotor and stator units to provide convective cooling, made effective because of the turbulence induced as a result of the differential speeds of the rotor and stator.

The cooling system as described above is highly effective, and does not produce any spurious torque. No undesirable torque can be generated at the intake 40 because of its central, axial location with respect to the shaft of the gyro motor. The exhaust of the cooling air from the gyro case is first pressure equalized by entrance of this air into the plenum chambers formed by spaces 51 and 52, from which the air escapes over baffled paths all around the case rotational axis, thereby preventing any jet effect which could produce a spurious torque, about that axis.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is, therefore, claimed in any of its forms or modifications within the legitimate and valid scope of the appended claims.

What is claimed is:

1. An air cooled gyro motor comprising a case, an inner gyro stator and an outer gyro rotor within said case, said rotor being mounted on a gyro shaft, said case having an air inlet opening therethrough in line with the axis of said shaft, said shaft having an axial bore therein connecting said inlet opening with a space within said case at one end of said stator and rotor, said case having a second space at the other end of said stator and rotor connected only by the clearance between said stator and rotor, means on each side of said case forming a support for said case to rotate at right angles to the axis of rotation of said shaft, an air outlet means around each of said case support means, said air outlet means at each support means being positioned to exhaust air in opposite directions around the case rotational axis to cancel emission torques.

2. An air cooled gyro motor comprising a case, an inner gyro stator and an outer gyro rotor within said case, said rotor being mounted on a gyro shaft, said case having an air inlet opening therethrough in line with the axis of said shaft, said shaft having an axial bore therein connecting said inlet opening with a space within said case at one end of said stator and rotor, said case having a second space at the other end of said stator and rotor connected only by the clearance between said stator and rotor, means on each side of said case forming a support for said case to rotate at right angles to the axis of rotation of said shaft, and means for exhausting air from said case substantially 360° around each of said case supporting means.

3. An air cooled gyro motor comprising a case, an inner gyro stator and an outer gyro rotor within said case, said rotor being mounted on a gyro shaft, said case having an air inlet opening therethrough in line with the axis of said shaft, said shaft having an axial bore therein connecting said inlet opening with a space within said case at one end of said stator and rotor, said case having a second space at the other end of said stator and rotor connected only by the clearance between said stator and rotor, means on each side of said case forming a support for said case to rotate at right angles to the axis of rotation of said shaft, means forming a plenum chamber adjacent each of said case support means and symmetrical with the axis of rotation of said case, said plenum chambers being open to the periphery of said rotor and symmetrically open to the atmosphere.

4. An air cooled gyro motor comprising a case, an inner gyro stator and an outer gyro rotor within said case, said rotor being mounted on a gyro shaft, said case having an air inlet opening therethrough in line with the axis of said shaft, said shaft having an axial bore therein connecting said inlet opening with a space within said case at one end of said stator and rotor, said case having a second space at the other end of said stator and rotor connected only by the clearance between said stator and rotor, means on each side of said case forming a case support for said case to rotate at right angles to the axis of rotation of said shaft, means forming a plenum chamber adjacent each of said case supports and symmetrical with the axis of rotation of said case, said plenum chambers being open to the periphery of said rotor, air outlet means lying in a plane parallel to the shaft of said rotor and directed from said plenum chamber to the atmosphere.

5. An air cooled gyro motor comprising a case, an inner gyro stator and an outer gyro rotor within said case, said rotor being mounted on a gyro shaft, said case having an air inlet opening therethrough in line with the axis of said shaft, said shaft having an axial bore therein connecting said inlet opening with a space within said case at one end of said stator and rotor, said case having a second space at the other end of said stator and rotor connected only by the clearance between said stator and rotor, means on each side of said case forming a case support for said case to rotate at right angles to the axis of rotation of said shaft, means forming a plenum chamber adjacent each of said case supports and symmetrical with the axis of rotation of said case, said plenum chambers being open to the periphery of said rotor, air outlet means lying in a plane parallel to the shaft of said rotor and directed from said plenum chamber to the atmosphere and baffle means on the outside of said case in the path of air from said air outlet means.

6. An air cooled gyro motor comprising a case, an inner gyro stator and an outer gyro rotor within said case, said rotor being mounted on a gyro shaft, said case having an air inlet opening therethrough in line with the axis of said shaft, said shaft having an axial bore therein connecting said inlet opening with a space within said case at one end of said stator and rotor, said case having a second space at the other end of said stator and rotor connected only by the clearance between said stator and rotor, means on each side of said case forming a case support for said case to rotate at right angles to the axis of rotation of said shaft, means forming a plenum chamber adjacent each of said case supports symmetrical with the axis of rotation thereof, said plenum chambers being open to the periphery of said rotor, and means defining a plurality of air outlets from said plenum chambers directing air therefrom in directions in a plane parallel to the axis of rotation of said rotor, each of said outlets having an outlet spaced 180° therefrom.

7. An air cooled gyro motor comprising a case, an inner gyro stator and an outer gyro rotor within said case, said rotor being mounted on a gyro shaft, said case having an air inlet opening therethrough in line with the axis of said shaft, said shaft having an axial bore therein connecting said inlet opening with a space within said case at one end of said stator and rotor, said case having a second space at the other end of said stator and rotor connected only by the clearance between said stator and rotor, means on each side of said case forming a case support for said case to rotate at right angles to the axis of rotation of said shaft, means forming a plenum chamber adjacent each of said case supports symmetrical with the axis of rotation thereof, said plenum chambers being open to the periphery of said rotor, and means defining a plurality of air outlets from said plenum chambers directing air therefrom in directions in a plane parallel to the axis of rotation of said rotor, each of said outlets having an outlet spaced 180° therefrom and means for baffling air escaping from said outlets.

References Cited in the file of this patent
UNITED STATES PATENTS

| | | |
|---|---|---|
| 2,344,112 | Rybka | Mar. 14, 1944 |
| 2,380,578 | Carlson | July 31, 1945 |
| 2,413,285 | Bousky | Dec. 31, 1946 |